(12) United States Patent
Serkh

(10) Patent No.: US 6,450,907 B1
(45) Date of Patent: Sep. 17, 2002

(54) INNER RACE IDLER PULLEY TENSIONER

(75) Inventor: Alexander Serkh, Troy, MI (US)

(73) Assignee: The Gates Corporation, Denver, CO (US)

( * ) Notice: Subject to any disclaimer, the term of this patent is extended or adjusted under 35 U.S.C. 154(b) by 11 days.

(21) Appl. No.: 09/805,069

(22) Filed: Mar. 12, 2001

(51) Int. Cl.[7] ............................................. F16H 7/12
(52) U.S. Cl. ..................... 474/135; 474/133; 474/138; 474/117
(58) Field of Search ................. 474/101, 138, 474/133, 135, 136, 112–117, 547, 546, 544, 588, 587, 449

(56) References Cited

U.S. PATENT DOCUMENTS

| | | | |
|---|---|---|---|
| 4,713,044 A | * 12/1987 | Nakamura et al. | 474/135 |
| 4,973,290 A | * 11/1990 | Hans et al. | 474/117 |
| 4,976,661 A | * 12/1990 | Ojima | 474/138 |
| 5,209,194 A | 5/1993 | Adachi et al. | 123/90.17 |
| 5,272,889 A | 12/1993 | Harris | 62/429 |
| 5,421,788 A | * 6/1995 | Toth | 474/135 |
| 5,462,489 A | 10/1995 | Kan et al. | 464/179 |
| 5,725,448 A | 3/1998 | Kato et al. | 474/43 |
| 5,785,619 A | * 7/1998 | Nakakubo et al. | 474/109 |
| 5,873,799 A | * 2/1999 | Meckstroth | 474/101 |
| 5,897,214 A | 4/1999 | Nisley | 384/537 |
| 6,039,664 A | * 3/2000 | Schmid | 474/101 |
| 6,264,578 B1 | * 7/2001 | Ayukawa | 474/109 |
| 6,293,885 B1 | * 9/2001 | Serkh et al. | 474/133 |
| 2002/0010044 A1 | * 1/2002 | Ayukawa et al. | 474/135 |
| 2002/0010045 A1 | * 1/2002 | Serkh | 474/135 |

FOREIGN PATENT DOCUMENTS

| | | | | |
|---|---|---|---|---|
| DE | 4243331 | * | 6/1994 | 474/135 |
| JP | 59208251 | * | 11/1984 | 474/135 |
| JP | 62151657 | * | 7/1987 | 474/135 |
| JP | 62258252 | * | 11/1987 | 474/135 |
| JP | 62274142 | * | 11/1987 | 474/135 |
| JP | 1247859 | * | 10/1989 | 474/135 |
| JP | 2195052 | * | 8/1990 | 474/135 |
| JP | 3249455 | * | 11/1991 | 474/135 |
| JP | 5272606 | * | 10/1993 | 474/135 |

* cited by examiner

Primary Examiner—Jack Lavinder
Assistant Examiner—Devon Kramer
(74) Attorney, Agent, or Firm—J. A. Thurnau, Esq.; C. H. Castleman, Esq.; S. G. Austin, Esq.

(57) ABSTRACT

The invention comprises a tensioner having an inner race rotation idler pulley. The pulley having a web and a belt bearing surface connected to the web. The web is attached to an inner race of a bearing by a fastener. The pulley may be stamped out of sheet metal or of spun metal and may have a central hole for alignment with the central axis of the bearing. The outer race of the bearing is mounted to a pivot arm. The pivot arm comprises as least two pivot points for pivotably attaching the pivot arm to a mounting plate and a biasing member. The pivot points are contained within a periphery of the pulley. The biasing member urges the pivot arm and pulley against a belt to be tensioned.

10 Claims, 2 Drawing Sheets

INNER RACE IDLER PULLEY TENSIONER

FIELD OF THE INVENTION

The invention relates to tensioners, and more particularly to tensioners wherein the pulley comprises an inner race rotation pulley.

BACKGROUND OF THE INVENTION

Transmission of power by belt can be accomplished by a driver pulley and a single or series of driven pulleys about which a belt is trained. It is occasionally necessary for the belt to change direction as it operates between a driver pulley and a driven pulley in order to clear other components. In this case, the belt can be trained over idlers that allow the belt direction to be changed with minimal loss of efficiency. For tensioning the belt, automatic tensioners may be used. In such case, the idler pulley is installed on the tensioner pivot arm.

Idlers generally comprise a base that is mounted on a non-rotating surface. The belt bearing surface or pulley is then rotatably connected to the base by means of a bearing. The bearing may be a ball bearing type having an inner and outer race. In most arrangements, the inner race of the ball bearing is attached to the idler base or to the non-rotating mounting surface directly. The idler pulley is then attached to the outer race of the ball bearing. The outer race and the pulley rotate together.

It is also possible to attach the pulley to the inner race of the ball bearing, with the outer race being fixedly attached to a mounting surface.

Representative of the art is U.S. Pat. No. 5,421,788 to Toth which discloses a belt tensioner having an idler pulley and bearing assembly. The idler pulley and bearing assembly comprise a non-rotating outer race and a pulley shaft extending through an inner race. The pulley is fitted to the inner race by means of the shaft, which shaft is pressed together with a retaining cup to hold the pulley shaft within the bearing inner race. Bearing lubricant is placed in the cup.

What is needed is an inner race, idler pulley tensioner having an inner race idler pulley with a self-lubricating bearing. What is needed is an inner race idler pulley tensioner wherein the pivot points are contained with in a periphery of the pulley. The present invention meets these needs.

SUMMARY OF THE INVENTION

The primary aspect of the present invention is to provide an inner race idler pulley tensioner having an inner race idler pulley with a self-lubricating bearing.

Another aspect of the present invention is to provide an inner race idler pulley tensioner wherein the pivot points are contained with in a periphery of the pulley.

Other aspects of the invention will be pointed out or made apparent by the following description of the invention and the accompanying drawings.

The invention comprises a tensioner having an inner race rotation idler pulley. The pulley having a web and a belt bearing surface connected to the web. The web is attached to an inner race of a bearing by a fastener. The pulley may be stamped out of sheet metal and may have a central hole for alignment with the central axis of the bearing. The outer race of the bearing is mounted to a pivot arm. The pivot arm comprises as least two pivot points for pivotably attaching the pivot arm to a mounting plate and a biasing member. The pivot point shafts are contained within a periphery of the pulley. The biasing member urges the pivot arm and pulley against a belt to be tensioned.

BRIEF DESCRIPTION OF THE DRAWINGS

FIG. 1b is a detail of FIG. 1a.

DESCRIPTION OF THE PREFERRED EMBODIMENT OF THE INVENTION

Figure 1A:
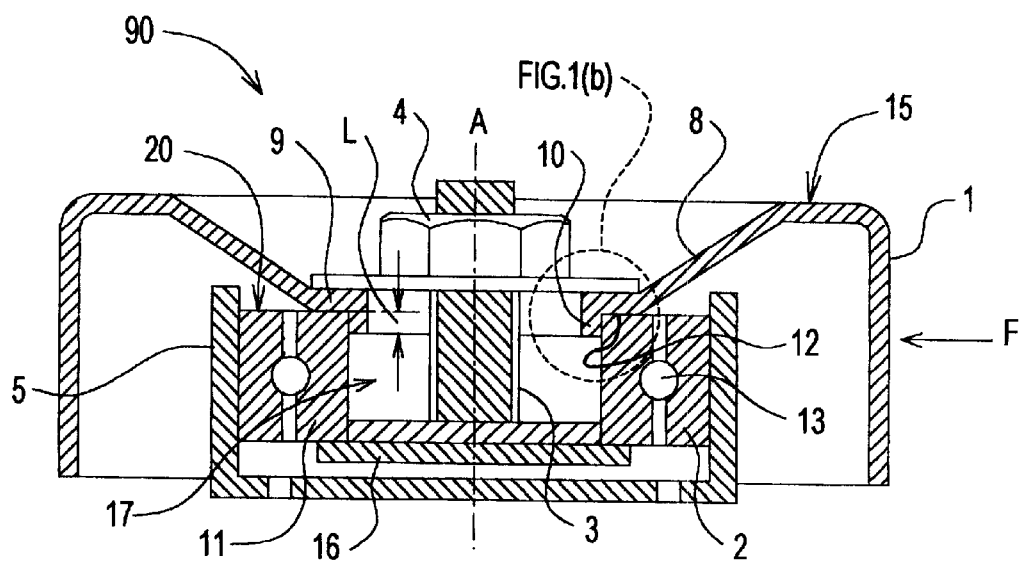
FIG. 1a depicts a cross-sectional elevation view of the pulley.

FIG. 1a depicts a cross-sectional elevation view of the pulley. Idler pulley 90 comprises pulley 15. Pulley 15 comprises belt bearing surface 1 and web 8. Pulley 15 may comprise a "backside" pulley wherein belt bearing surface 1 is smooth. Pulley 15 may also comprise a multi-ribbed belt bearing surface 1, or any other appropriate belt bearing profile. Belt bearing surface 1 describes a circular shape about a central axis. Pulley 15 may be stamped out of sheet metal or be spun by metal forming processes known in the art.

Figure 1B:
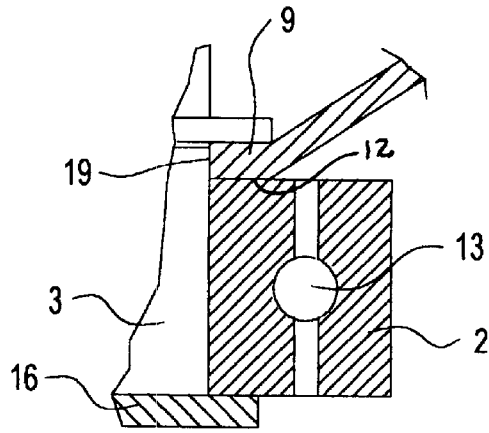

Pulley 15 also comprises land 9 and lip 10. Lip 10 extends normally or perpendicularly from land 9. The hole is centered in web 8. Land 9 has a width across the web and it encloses the centrally located hole. Web 8 may have a relief between land 9 and belt bearing surface 1 to enable the web 8 to clear the bearing or cup 5 to prevent web 8 from rubbing on outer race 2 during operation. In an alternate embodiment surface 19 on land 9 abuts a shoulder of fastener 3, which hold the pulley in proper alignment with inner race 11, see FIG. 1b. Fastener 3 may be installed through the central hole. Lip 10 may also extend obliquely from land 9 only as may be necessary to create an alignment and partial interference with inner race 11 for purposes of centering pulley 15 on central axis A, and for preventing lateral movement of pulley 15 from belt load F. Pulley 15 is also held in place by the clamping force of the nut 4 on land 9. Proper alignment of belt bearing surface 1 and inner race 11 is achieved by the perpendicularity of belt bearing surface 1 and land 9, and whereby land 9 is affixed to outer surface 12.

Bearing 20 comprises outer race 2, inner race 11, and ball bearings 13. Inner race 11 has surface 12 and describes inner race bore 17. Land 9 bears upon and is clamped to surface 12 by operation of fastener 3 and nut 4. Land 9 is formed to create a normal or perpendicular relationship between the belt bearing surface 1 and surface 12. In the preferred embodiment, lip 10 aligns pulley 15 within inner race bore 17. This, in turn, aligns belt bearing surface 1 parallel with a central axis A.

Bearing 20 can be any known in the art that comprises an inner race and outer race that rotate in relation to each other. This may include, but be not limited to ball bearings, needle bearings, roller bearings, or sleeve type bearings. Bearing 20 self-lubricating in the preferred embodiment.

Fastener 3, comprising a bolt, and a retainer comprising a nut 4, and flange 16 secure pulley 15 to inner race 11. Fastener 3 may also comprise a post having a flange 16 that cooperates with a snap ring (not shown) in lieu of a nut. Fastener 3 does not necessarily function as a means to align pulley 15 with central axis A. Bolt 3 and nut 4 simply secure land 9 to the inner race outer surface 12.

In the preferred embodiment, pulley 15 rotates with inner race 11 while outer race 2 remains stationary. Holding the outer race 2 stationary significantly reduces the race velocity and therefore the velocity of the ball bearings. This in turn significantly reduces bearing wear and decreases lubrication requirements.

Figure 2:
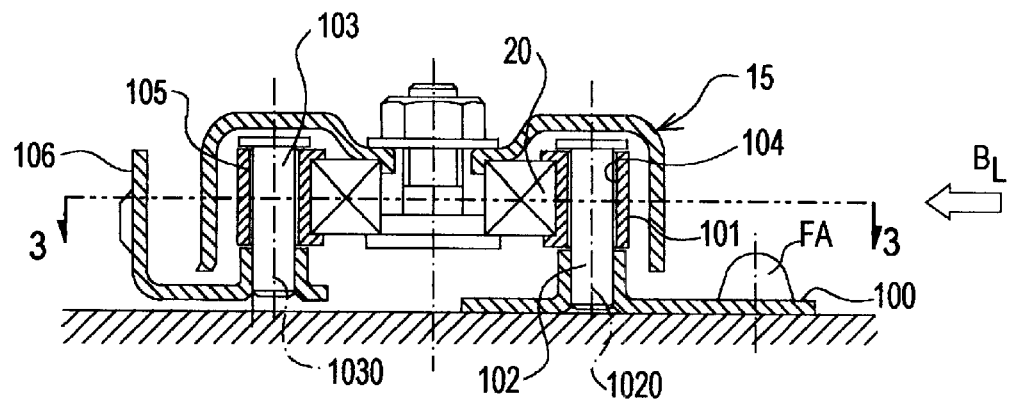
FIG. 2 is a cross-section view of the tensioner.

FIG. 2 is a cross-section view of the tensioner. The pulley depicted in FIG. 1a is shown incorporated into the body of the tensioner, with the exception that cup 5 is replaced with pivot arm 101. Pivot arm 101 comprises two bores 104 and 105. Each bore is coated with lubricated material, for example Nylon 6/6 with PTFE, thereby comprising a bearing.

Arm 101 engages an outer race of bearing 20. Arm 101 may comprise a plastic or metallic material. An outer race of bearing 20 is over-molded in the plastic arm embodiment. The outer race of bearing 20 may also be press fit into the metallic or thermoplastic arm embodiment.

Pivot shaft 102 is mounted in base 100. The tensioner is attached to a mounting surface by fasteners FA and FB through base 100, see FIG. 3. Bore 104 pivotably engages shaft 102. Arm 106 also comprises pivot shaft 103. Bore 105 pivotably engages shaft 103. A biasing member as described in FIG. 3 engages bracket 106. Bracket 106 is affixed to tensioner body 200. Pivot shaft 102 and 103 each have a central axis 1020 and 1030 respectively. Each pivot shaft 102, 103 is spaced apart from the other on the pivot arm on opposite sides of a line described by a belt load vector, $B_L$, see FIG. 3.

One will note that the pulley covers both shafts 102 and 103, that is, each pivot is contained within a periphery of the pulley. This provides improved protection for sealing each against debris, thereby enhancing pivot bearings and shaft life.

Bearing 20 also describes major plane 3—3. In the preferred embodiment, major plane 3—3 intersects shafts 102, 103 as well as belt bearing surface 1. The belt load vector substantially aligns with major plane 3—3. This eliminates uneven bearing wear otherwise caused by an offset between a belt load vector and a bearing surface. Further, in the preferred embodiment a central axis C—C, see FIG. 4, of biasing member 200 is substantially coplanar with major plane 3—3.

Figure 3:
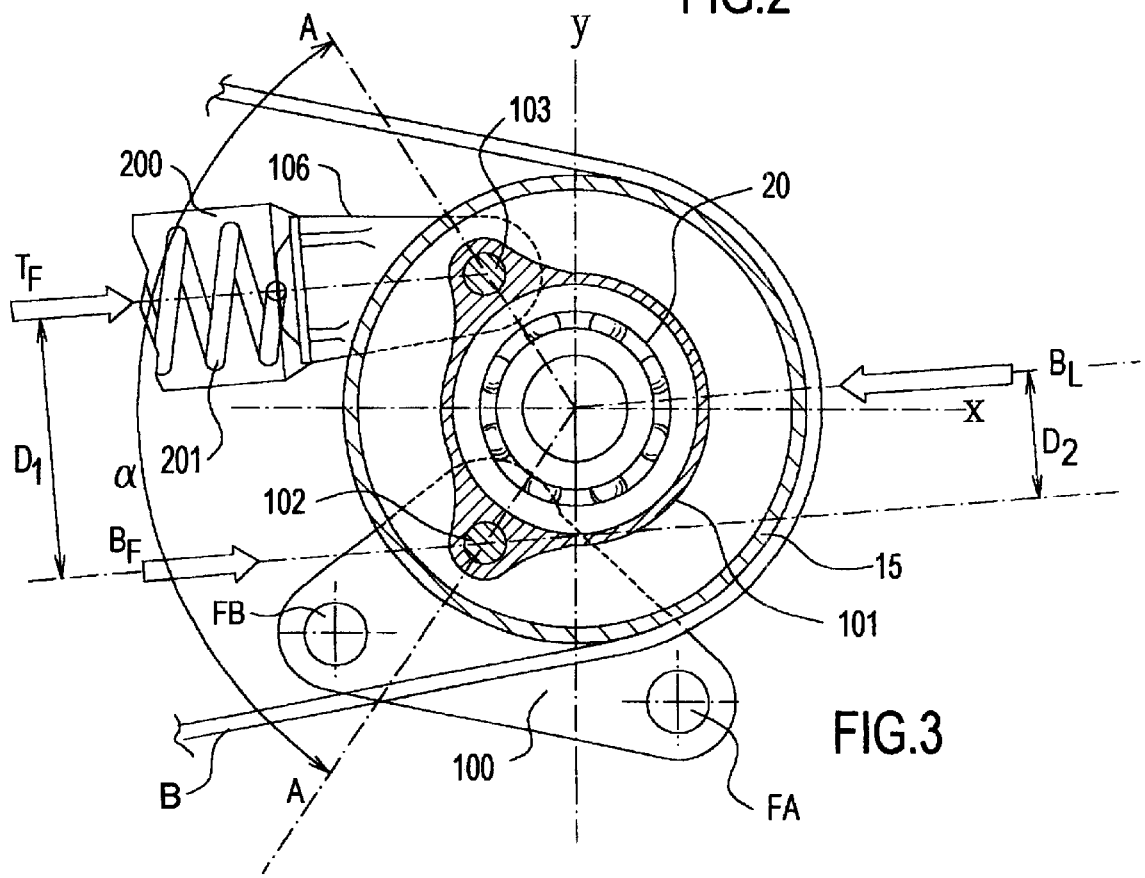
FIG. 3 is a plan view of the tensioner with a cross-section though plane 3—3.

FIG. 3 is a plan view of the tensioner with a cross section through plane 3—3. Biasing member 200 is shown connected to bracket 106. Shafts 102 and 103 are shown having an angular separation α. One skilled in the art can appreciate that the relative location of shafts 102 and 103, namely angle α, can be adjusted to properly balance a biasing member force $T_F$ and a belt tension force or hubload, $B_L$. Since $$B_L = T_F + B_F$$

one can readily conclude that by adjusting distance D, between the vector $T_F$ and the pivot 102, one can specify the magnitude of the vector $T_F$ to balance hubload $B_L$. Namely:

$$B_L(D_2) - T_F(D_1) = 0$$

So:

$$T_F = B_L(D_2)/(D_1)$$

A like change in distance $D_2$ can also be made with the same result. More particularly, $D_1$ and $D_2$ are selected to place the shafts 102, 103 within a periphery of the pulley.

Figure 4:
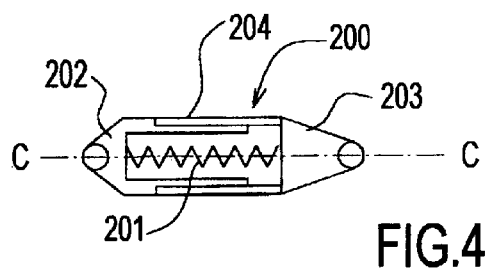
FIG. 4 is a cross-sectional view of a biasing member.

FIG. 4 is a cross-sectional view of a biasing member. Biasing member 200 comprises a spring 201 contained within moveable parts 202, 203. Spring 201 may comprise a coil spring or any other suitable for biasing members apart. Part 202 slidingly telescopically engages part 203 on a perimeter surface. Perimeter surface 204 comprises a material having a predetermined frictional coefficient, for example and not as limitation, PTFE or Nylon 6/6. Perimeter surface 204 damps oscillations of the biasing member and thereby the pulley during operation. The biasing member may comprise any known in the art for biasing a tensioner arm, including those having a spring with a damping mechanism. The damping mechanism may comprise a hydraulic mechanism, frictional sliding surfaces or a combination of the two. The biasing member may also be in contact with pivot shaft 103 directly without the need for bracket 106, see FIG. 1c. The biasing member may also comprise the biasing/damping member disclosed in U.S. application Ser. No. 09/549258, incorporated herein by reference.

Figure 1C:
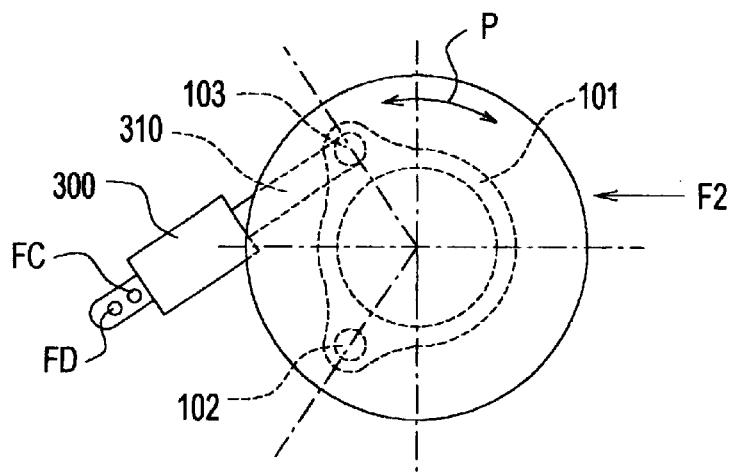
FIG. 1c is a plan view of an alternate connection between the hydraulic damper and shaft.

FIG. 1C is a plan view of an alternate connection between the hydraulic damper and shaft. Hydraulic biasing member 300 is affixed to a mounting surface with fasteners FC and FD. These hold shaft 310 of member 300 in contact with and in proper alignment with shaft 103. Pivot arm 101 pivots about shaft 102, moving and maintaining shaft 103 in contact with shaft 310. The internal configuration of biasing member may also comprise that described in FIG. 4. Shaft 103 may pivot to facilitate movement of the shaft 103 upon the end of shaft 310, in effect, allowing it roll upon the surface of an end of shaft 310.

Although a single form of the invention has been described herein, it will be obvious to those skilled in the art that variations may be made in the construction and relation of parts without departing from the spirit and scope of the invention described herein.

I claim:

1. A tensioner comprising:

a base having a first shaft;

a pivot arm pivotally attached to the first shaft and the pivot arm having a second shaft;

a pulley journaled to the pivot arm;

the pulley comprising a belt bearing surface and a web, the web attached to an inner race of a bearing;

a biasing member having an end pivotally attached to the second shaft and an opposite end for pivotal attachment to a mounting surface, whereby a belt load force exerted on the pulley is opposed by a biasing member force;

the web having a plane normal to the belt bearing surface and having a land portion having a width and being substantially centered in the web;

the bearing having an inner race and an outer race, the inner race having an outer surface normal to a bearing central axis and describing an inner race bore; and the land portion affixed to the outer surface, whereby the belt bearing surface is substantially perpendicular to the outer surface.

2. The tensioner as in claim 1, wherein the first shaft and second shaft are on opposite sides of a belt load vector, $B_L$.

3. The tensioner as in claim 2 wherein;

the first shaft in contained within a periphery of the pulley; and the second shaft is contained within a periphery of the pulley.

4. The tensioner as in claim 3, wherein:

the bearing defines a bearing plane; and the bearing plane simultaneously intersects the belt bearing surface and each shaft.

5. The tensioner as in claim 1; wherein the biasing member comprises:

a spring biasing a first part from a second part;

the first part and second part each having slidingly engaged surfaces wherein at least one of the surfaces has a predetermined coefficient of friction to damp a movement of the first part relative the second part.

6. A tensioner comprising:

a base having a first shaft;

a pivot arm pivotally attached to the first shaft and the pivot arm having a second shaft;

a pulley journaled to the pivot arm;

the pulley comprising a belt bearing surface and a web, the web attached to an inner race of a bearing;

a biasing member having an end pivotally attached to the second shaft and an opposite end for pivotal attachment to a mounting surface, whereby a belt load force exerted on the pulley is opposed by a biasing member force;

the first shaft in contained within a periphery of the pulley;

the second shaft is contained within a periphery of the pulley;

the bearing defines a bearing plane; and the bearing plane simultaneously intersects the belt bearing surface and each shaft.

7. The tensioner as in claim 6, wherein the first shaft and second shaft are on opposite sides of a belt load vector, $B_L$.

8. The tensioner as in claim 7 wherein the pulley further comprises;

the web having a plane normal to the belt bearing surface and having a land portion having a width and being substantially centered in the web;

the bearing having an inner race and an outer race, the inner race having an outer surface normal to a bearing central axis and describing an inner race bore; and the land portion affixed to the outer surface, whereby the belt bearing surface is substantially perpendicular to the outer surface.

9. A tensioner comprising:

a base having a shaft;

a pivot arm pivotally attached to the shaft and the pivot arm having a bearing surface;

a pulley journaled to the pivot arm;

the pulley comprising a belt bearing surface and a web, the web attached to an inner race of a bearing;

a biasing member having an end in contact with the bearing surface and an opposite end mounted to a mounting surface, whereby the biasing member end is held in moveable contact with the bearing surface; and the shaft is contained within a periphery of the pulley.

10. The tensioner as in claim 9 wherein:

the bearing surface is contained within a periphery of the pulley.

* * * * *